(12) United States Patent
Fleckner et al.

(10) Patent No.: US 6,589,682 B1
(45) Date of Patent: Jul. 8, 2003

(54) FUEL CELLS INCORPORATING NANOTUBES IN FUEL FEED

(76) Inventors: Karen Fleckner, 1922 Lighthouse La. NE., Tacoma, WA (US) 98422; Feng Zheng, 6247 35th Ave. NE., Seattle, WA (US) 98115; Cynthia Buenviaje, 12316 28th NE. #317, Seattle, WA (US) 98125; Yao Huang, 18709 SE. 17 St., Vancouver, WA (US) 98683; Jeff Pedersen, 3835 South "A" St., Tacoma, WA (US) 98408; David Lim, 2108 NE. 85th St., #5, Seattle, WA (US) 98115; H. Sho Fuji, 12301 20th Ave. NE., Seattle, WA (US) 98125; Jeremy Hergesheimer, 5337 15th Ave. NE., Apt. 406, Seattle, WA (US) 98105; Michael Treiber, 5224 20th Ave. NE., Seattle, WA (US) 98105

( * ) Notice: Subject to any disclaimer, the term of this patent is extended or adjusted under 35 U.S.C. 154(b) by 0 days.

(21) Appl. No.: 09/642,198

(22) Filed: Aug. 18, 2000

Related U.S. Application Data (60) Provisional application No. 60/178,494, filed on Jan. 27, 2000.

(51) Int. Cl.[7] ................................................. H01M 2/02
(52) U.S. Cl. .............................. 429/34; 429/37; 429/38; 429/46
(58) Field of Search ............................. 429/34, 37, 38, 429/46

(56) References Cited

U.S. PATENT DOCUMENTS 6,290,753 B1 * 9/2001 Maeland et al. ............. 206/0.7
6,331,262 B1 * 12/2001 Haddon et al. .............. 252/502

FOREIGN PATENT DOCUMENTS

WO          WO 01/89013      * 11/2001      ............ H01M/8/00

OTHER PUBLICATIONS

Che et al. "Metal–Nanocluster–Filler Carbon Nanotubes: Catalytic Properties and Possible Applications in Electrochemical Energy Storage and Production," Langmuir, 15, (1999) 750–758.*

* cited by examiner

Primary Examiner—Carol Chaney
Assistant Examiner—Dah-Wei Yuan
(74) Attorney, Agent, or Firm—Dorsey & Whitney LLP (57) ABSTRACT

A novel design and process for: a) a membrane electrode assembly (MEA) with aligned carbon nanotubes as a nanoscale gas distributor which yield better gas conversion efficiencies in PEM fuel cells, and (b) doped silicon flow field plates (FFP) which increase electrode conductivity of the membrane-catalyst-gas diffusion layer (GDL)-FFP interfaces of the proton exchange membrane fuel cell (PEMFC). Also, part of the invention are a stacking configuration and a gas distribution design that also enhance conductivity of carbon/metal catalyst/electrode, GDL, and FFP interfaces surfaces without crushing the FFPs. Aligned carbon nanoscale gas distributors are employed at the interfaces, thereby increasing the overall performance of the PEMFC. The FFPs are easy to manufacture and mass-producible, yet mechanically sturdy and significantly lighter in weigh than their conventional counterparts. Another novel feature of the invention is an integrated monitoring and communication/Internet system located directly or connected to the FFP.

25 Claims, 8 Drawing Sheets

FUEL CELLS INCORPORATING NANOTUBES IN FUEL FEED

RELATION TO ANOTHER APPLICATION

The present application is related to provisional application No. 60/178,494 filed Jan. 27, 2000. The benefit of the filing date of the provisional application is claimed.

TECHNICAL FIELD OF THE INVENTION

In one aspect, the present invention relates to novel, improved proton exchange membrane ("PEM") fuel cells.

In a second aspect, the present invention relates to novel, improved components for PEM fuel cells and fuel cell stacks and to processes for manufacturing and assembling those components.

In still other aspects, the present invention relates to novel stacking configurations, humidification features, and gas distribution designs for PEMs.

DEFINITIONS

In the interest of clarity and brevity, abbreviations will be employed extensively in this specification. These abbreviations are listed below:

| Term | Abbreviation |
| --- | --- |
| Proton Exchange Membrane | PEM |
| Membrane Electrode Assembly | MEA |
| Solid Polymer Electrolyte | SPE |
| Gas Diffusion Layer | GDL |
| Flow Field Plate | FFP |
| Nanoscale Gas Distribution System | NGDS |
| Single Walled Nanotube | SWNT |
| Chemical Vapor Deposition | CVD |
| Physical Vapor Deposition | PVD |
| Single Walled Carbon Nanotubes | SWNT |
| Programmable Logic Device | PLD |

BACKGROUND OF THE INVENTION

Sir William Grove in 1839 showed that he could create electrical energy from chemical energy, the reverse of electrolysis of water, by using platinum electrodes. More recently, major efforts have been directed to the development of PEM fuel cells. PEM fuel cells have been used in NASA's Space Programs for over 20 years, and are currently of greater interest as a means of addressing the growing concerns of pollution related to the use of internal combustion engines in our society.

The basic components of a fuel cell include: an anode, a cathode, an electrolyte, and delivery systems for fuel and oxygen. When the cell is in operation, the electrodes are connected to an external load by conducting wires. In a PEM fuel cell, the electrolyte is comprised of a thin membrane made of a polymer similar to polytetrafluoroethylene (commonly known under the trade name TEFLON), but incorporating sulfonic acid groups within the polymer's molecular structure. NAFION® 117, NAFION® 112, AND NAFION® 115 are typical. These are solid polymer electrolytes ("SPE") available from E.I. DuPont de Nemours & Co. The sulfonic acid groups are acid ions and constitute the active electrolyte. The membrane functions to conduct hydrogen nuclei ($H^+$ ions or protons) from one face through the membrane to the opposite face while effectively blocking the flow of diatomic hydrogen molecules through the membrane. The electrodes, catalyst, and membrane electrolyte together form the MEA.

Hydrogen is oxidized at the anode as it comes into contact with a catalyst (typically platinum), and is disassociated into protons and electrons. The protons are solvated by water in the membrane, and travel through the membrane by passing from one sulfonic acid group to the next. As the protons migrate across the SPE the electrons travel through the external load to the cathode. Reduction occurs at the cathode where oxygen reacts with the protons and electrons to form water and heat, the sole byproducts. In the PEM fuel cell, the two reactions are:

$2H_2 \rightarrow 4H^+ + 4e^-$ at the anode side of the cell, and $O_2 + 4H^+ + 4e^- \rightarrow 2H_2O$ at the cathode side of the cell.

Since the maximum electrochemical potential for the reaction of water is 1.23 volts with an electrical efficiency of about 0.5–0.8 for a single cell at room temperature, a stacking arrangement of single cells in series is needed to deliver currents at various desired voltages for most practical applications.

Typical problems which inhibit the efficiency of heretofore proposed PEM fuel cells are gas distribution, current collection, and membrane hydration, which affects hydrogen/oxygen conversions and internal resistances. Other problems associated with the currently existing PEM fuel cells focus on economic issues such as the ability to mass produce the fuel cells, and how to monitor and maintain them once they have been delivered to the consumer.

One of the more significant problems posed by currently existing PEM fuel cells is the reactant gas efficiency. The efficiency of converting the reactant gases to the product is related, in large part, to the hydrogen/oxygen gas distribution within the cell at the anode and cathode respectively. Because not all reactant gas introduced to the fuel cell is converted from chemical to electrical energy, a greater supply of fuel is needed to produce a desired output than is suggested by the foregoing equations, thereby lessening the otherwise beneficial attributes of the system.

The poor reactant gas efficiency is primarily due to the crossover of unreacted gases through the SPE. In traditional PEM fuel cells, the electrodes are comprised of a carbon/platinum/polymer-based slurry that is deposited onto the SPE. When a fuel gas (i.e. hydrogen) locates the catalyst, it must bind to the catalyst site, yield an electron, and be immediately solvated into the electrolyte. A problem arises because the reactant gases do not always find a catalyst reaction site covered or enveloped by the electrolyte with which to bind and react. The lack of transport control of reactant gases to the catalyst reaction sites therefore limits the kinetics of the reaction and produces an inefficient result.

One solution to this problem is to provide a higher concentration of catalyst in the electrode slurry. This, however, has disadvantages because the catalyst is often a precious metal, the increased use of which significantly adds to the overall cost of the fuel cell.

An additional problem with currently existing PEM fuel cells is the low conductivity of the traditional carbon/metal-catalyst electrode's gas diffusion layer (GDL) and flow field plate (FFP) interface surfaces. In order to direct the electrical energy produced by the fuel cell to the external load, a means must be provided to: (a) collect the electron flow over the entire area of the membrane; and (b) ensure an uninterrupted electrically conductive flow path from the catalyzed surfaces (electrodes) of the membrane to these current-collector devices. Conductivity of these layers is usually limited to the conductivity or resistivity of the collection plate material (e.g., graphite has a resistivity of 1100 $\mu\Omega\cdot cm$). Some collector plates and/or GDLs are made of metals such as corrosion resistant stainless steel. Although use of this material will increase conductivity of the collector plate, such use will also undesirably increase the weight of the fuel cell, particularly when it is incorporated into a stacked configuration to produce the desired output. Other materials, incorporating metals in varying concentrations, are available to increase the conductivity of the collector plate, but their use is not cost-effective for the mass production of PEM fuel cells. Moreover, the manufacture of traditional carbon graphite FFPs is costly and also results in a heavy collection plate (carbon graphite has a bulk density of 1.77 $g/cm^3$), making the stacking needed for a desired voltage range less effective in terms of power-to-weight ratio.

A third efficiency problem associated with currently existing PEM fuel cells relates to the issue of hydration. Because the SPE membrane's conductivity is coupled to the amount of water present, particularly in relation to the anode, a means of keeping the membrane moist to a controlled degree is necessary.

SUMMARY OF THE INVENTION

There have now been invented and disclosed herein certain new and novel PEM fuel cells incorporating stacking configurations which provide for the delivery of current at voltages consistent with the practical application of the fuel cells, which is not true of the prior art PEM fuel cells. Confining the reactant gases to the desired areas of flow in a membrane-minimizing configuration is optimized for PEM fuel cells in accord with the principles of the present invention by effecting the uniform distribution of a force on the fuel cell components that increases the conductivity of the carbon/metal-catalyst electrode, GDL, FFP interface surfaces, thereby increasing fuel cell performance with higher current densities. It is an important and novel feature of the present invention that this force can be applied without crushing the FFPs.

The present invention further provides both a new and novel MEA for fuel cells and processes of manufacturing the same in a more cost effective manner with more efficient current collection devices and gas diffusion features than the prior art MEAs. These new MEAs incorporate nanoscale tubes using fullerene products to provide gas distribution directly to the reaction sites at the doped silicon electrode interfaces. This nanoscale gas delivery system improves gas efficiencies by delivering the reactant gases directly to the immediate vicinity of the reaction sites, thus limiting the amount of catalyst necessary for efficient operation by concentrating the catalyst at the interface with the SPE where the proton nuclei can be most effectively solvated and passed through the SPE membrane to the cathode.

The present invention also comprises new and novel doped silicon FFPs with humidification features and a monitoring/communication interface. This interface produces higher membrane conductivity and a more efficient collection of electrical current with a reduced weight and a greater cost efficiency in comparison to the prior art PEM fuel cells. Doping the silicon with an electrically active impurity reduces the resistivity of the silicon by several orders of magnitude, which results in a more efficient electrical collection device with a lower weight than currently existing carbon graphite devices. Silicon offers high mechanical strength, and can be readily patterned and etched using both dry (plasma) and wet chemical procedures to produce customized gas channel configurations in the substrate. In addition, since the silicon is a planar substrate, the option of using 'Soft Lithographic' techniques to pattern and etch the surface are also available. Soft lithography represents a patterning scheme that is based on self-assembly and replica molding of microstructures and nanostructures. This technique offers a low-cost and effective methodology for the formation and manufacture of the features needed for fabrication of the PEM fuel cells of the present invention.

The objects, features, and advantages of the present invention will be apparent to the reader from the foregoing and the appended claims and as the ensuing detailed description and discussion proceeds in conjunction with the accompanying drawings.

BRIEF DESCRIPTION OF THE DRAWINGS

In the drawings, like reference numerals refer to like parts throughout the various views unless otherwise indicated.

DETAILED DESCRIPTION OF THE INVENTION

Figure 1:
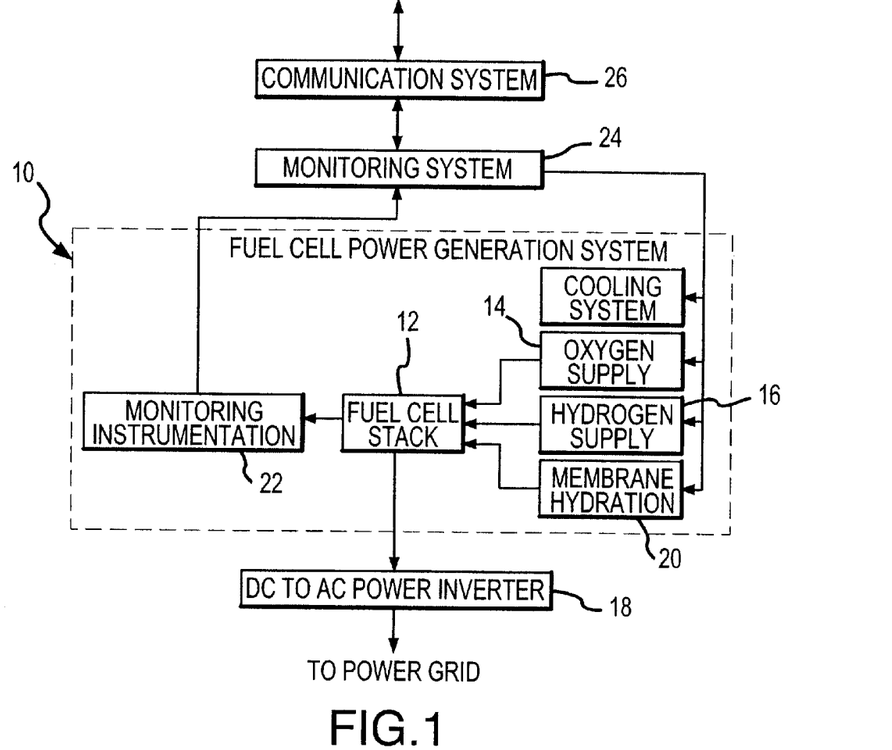
FIG. 1 is a block diagram of an electrical power generating system which employs a fuel cell stack embodying the principles of the present invention.

Referring now to the drawings, FIG. 1 is a block diagram of an electrical power generating system shown generally at 10 wherein a fuel cell stack 12 uses reactant gases from oxygen supply 14 and hydrogen supply 16 to generate an electrical current at a specified voltage (the number of fuel cells stacked in series determines the voltage output of the system). The direct current produced by the cell may be converted to alternating current by power inverter 18 and transmitted to an external load or power grid. An SPE membrane incorporated within the fuel cell in accordance with the present invention and described below is moistened by use of the membrane hydration feature 20 to promote efficient conductivity of the membrane for proton nuclei produced by the oxidation reactions at the anodes of the individual fuel cells incorporated within fuel cell stack 12.

Monitoring instrumentation 22 mounted in accordance with the present invention on the individual fuel cells or elsewhere in fuel cell stack 12 provides information to monitoring system 24 regarding particular attributes of the fuel cells including but not limited to the functional status, output, and/or fuel levels. This information is routed via communication system 26 to an Internet site or other specific destination. The communication system 26 may be comprised of any number of analog or digital devices such as a personal computer, a local area network, or a relay station for wireless communication. The fuel cell's own electrical output may be used to power such a system from a remote location, circumventing the need for an additional power supply to maintain the transmission of information on the status of the fuel cell power generation system 10.

Having observed the general interaction of the fuel cell with a monitoring and communication system of the present invention, attention may now be directed to the particular characteristics of the fuel cells of the present invention.

Figure 2:
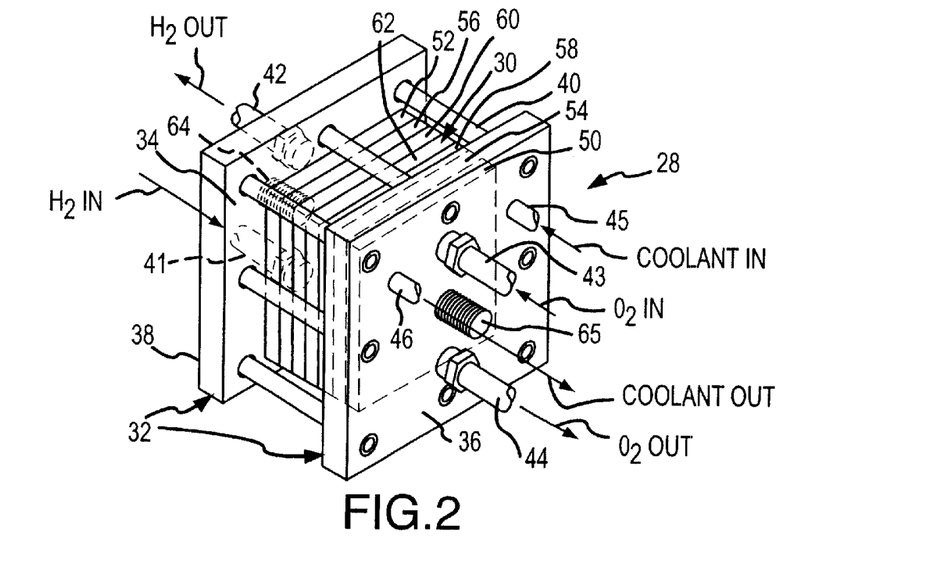
FIG. 2 is perspective view generally illustrating an assembled single stage fuel cell of the present invention; the respective layers of the fuel cell are not drawn to scale.
Figure 2A:
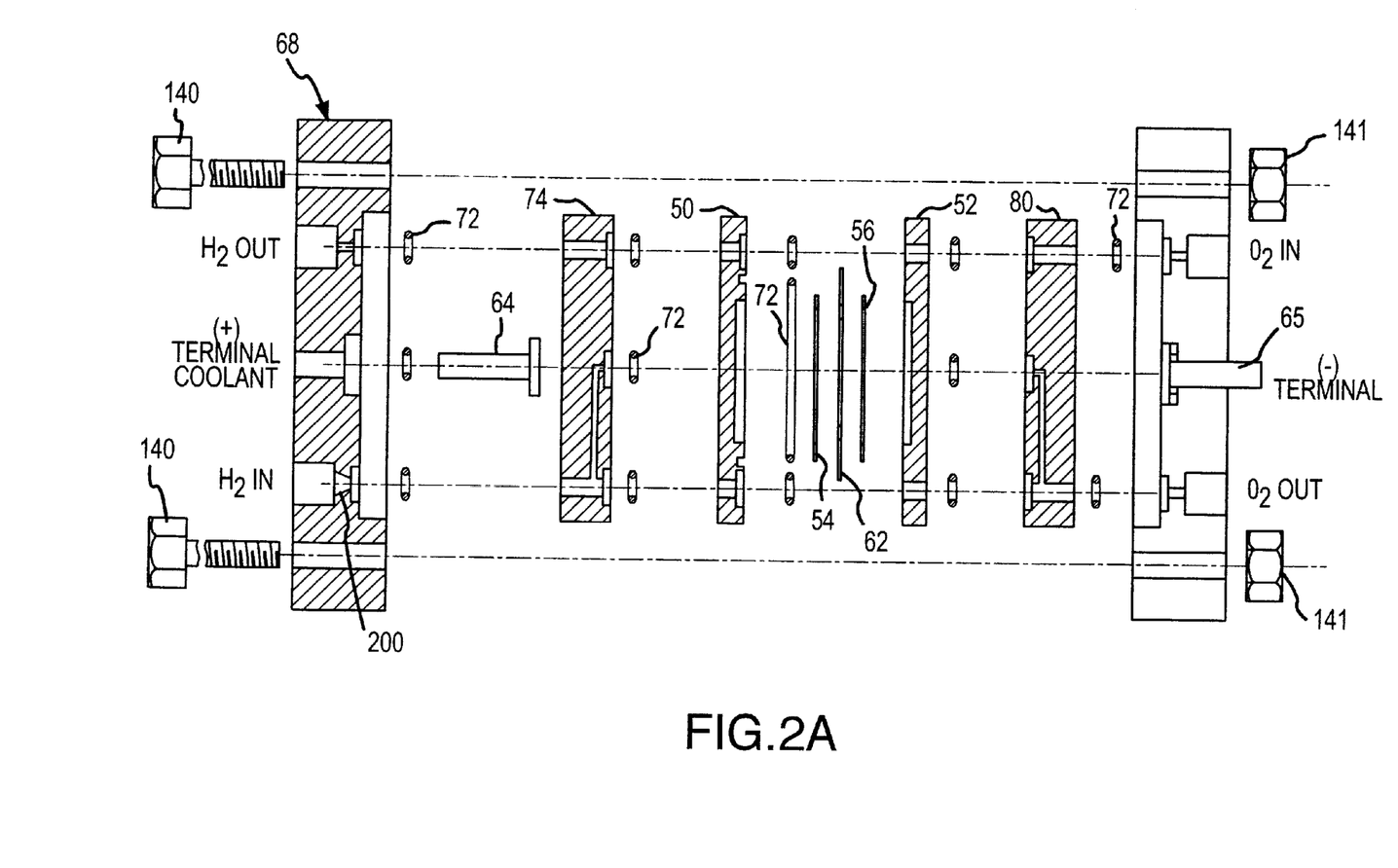
FIG. 2A is an exploded view of the FIG. 2 fuel cell.

Plates or casing components 36, 38 are fastened together by a series of bolts 40 and 41 positioned around the periphery of the fuel cell to isolate the interior of the cell from environmental contaminants and exert pressure on the components housed in the cavities of plates 36 and 38 by making the conducting of electricity across the interfaces more efficient. This force or pressure improves element-to-element surface contact and thereby improves fuel cell performance. The wanted, efficiency improving force on the fuel cell components can be obtained by torquing bolt 40 to a selected level.

References characters 41–46 in FIG. 2 identify conduit/port arrangements which have the following functions:

| Reference Character | Function of Identified Component |
| --- | --- |
| 41 | Fuel ($H_2$) In |
| 42 | Excess Fuel Out |
| 43 | Oxidizer ($O_2$) In |
| 44 | Oxidizer ($O_2$) Out |
| 45 | Coolant In |
| 46 | Coolant Out |

Components 45 and 46 are elements of a coolant heating/cooling system described hereinafter. As will there be discussed in more detail, the coolant is circulated through the fuel cell to keep the fuel cell operating temperature constant.

The two outermost layers 50, 52 are the cell's FFPs which deliver the reactant gases, provide an avenue of exhaust for unreacted gas and water generated at the fuel cell cathode, collect the electrical energy produced by the cell, and provide a means of hydrating the cell's membrane to facilitate more efficient conversion of the reactant gases to water and electrical energy. The next two fuel cell elements 54, 56 are the cell's GDLs, which provide a conductive, gas distribution system between FFPs 50, 52 and the thin catalytic electrodes 58, 60 applied to the two side of PEM 62.

The electrical energy collected by cathode FFP is transmitted to the exterior of the fuel cell by current collector 64 for transmission to an external load or power grid as previously described in reference to FIG. 1 The electrical circuit is completed from the load (or a power grid) to the cathode FFP to the fuel cell by internal conductor 65.

Figure 3:
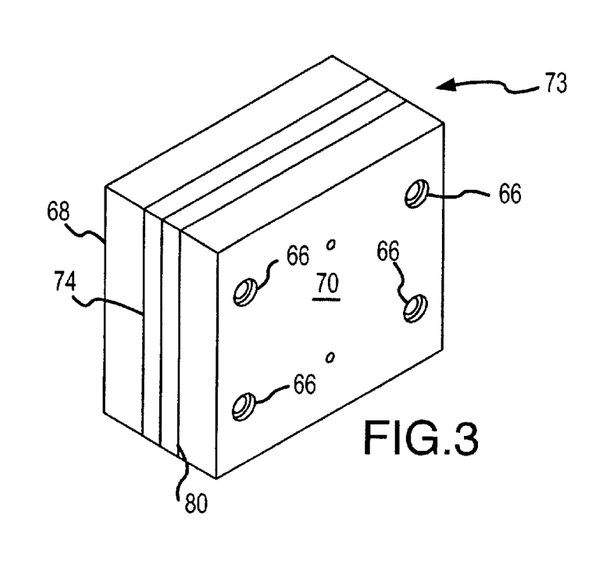
FIG. 3 is a view like FIG. 2 illustrating the internal architecture of the FFP design, and the gas delivery channels of a multi-stage fuel cell.

FIG. 3 illustrates a single fuel cell unit 73 with gas flow passages 66 and FFPs 74, 80 (see FIG. 4) along with dual function flow components 68 and 70. The fuel cell 73 and flow field components are designed to be incorporated into a fuel cell stack in order to achieve acceptable current densities at the higher voltages required for many practical applications.

Figure 4:
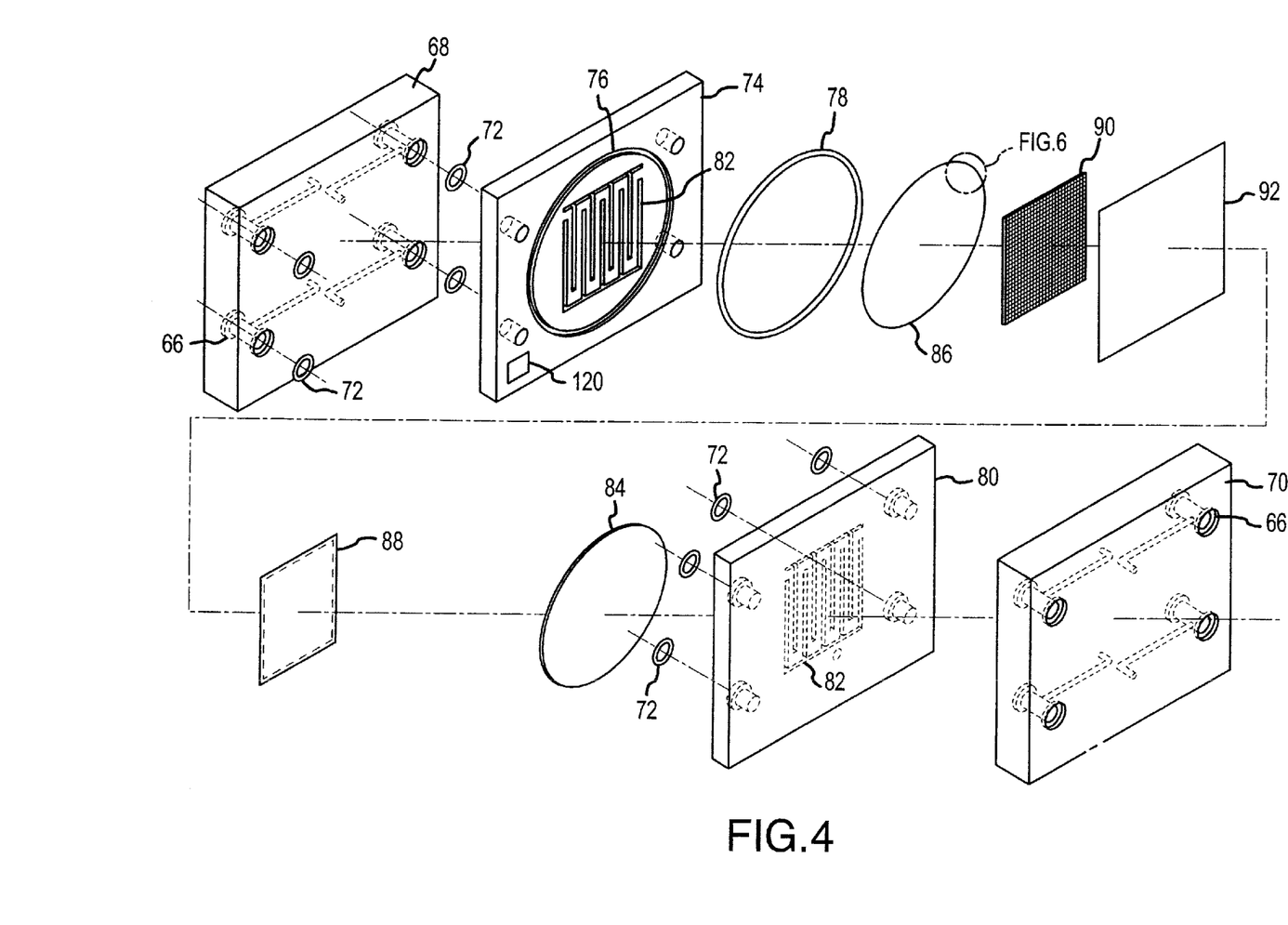
FIG. 4 is an exploded view of the multi-stage fuel cell illustrated in FIG. 3.

Turning now to FIG. 4 which is an exploded view of the single, multistage design fuel cell of FIG. 3, dual function flow components 68, 70 form a non-conductive barrier between individual fuel cells of a stacked configuration and provide a means of facilitating gas flow from one cell to the next via gas flow communication flow passage segments of passages 66. These segments are machined into the plates.

Elastomeric face seals 72 seal the gas flow passages and passage segments within the individual fuel cell. The hydrogen FFP 74 has a circular groove 76 machined into the inner surface thereof for receiving elastomeric static face seal 78. Face seal 78 seals the PEM fuel cell cavity in which the chemical reactions liberate protons and electrons. The oxygen FFP 80 is identical in all respects to the hydrogen FFP except that its surface is flat and contains no groove, instead having a surface against which elastomeric static face seal 78 can be sealed.

Each FFP may be manufactured from boron, arsenic, or phosphorous-doped silicon using standard silicon industry practices as described in, for example, VSLI Technology, S. M. Sze, Chapter 6, pp. 219–264 and Solid State Technology, 1976, Monokowski, J. and Stach, J., "System Characterization of Planar Source Diffusion." The doped FFP is machined to form the interdigitalized channels 82 which provide a means of gas delivery to the GDLs 84, 86 located at the interior surface of each FFP in the assembled fuel cell. The channels can also, and may preferably be, formed by sequential masking and etching steps, see VSLI Technology, supra, Chapter 7, pp. 267–300.

Although the resistivity of silicon is greater than the more traditionally used carbon graphite, this can be an advantage when the silicon is doped, causing its resistivity to become negligible. Selective areas only of the FFP may in this way be made highly conductive while the rest of the FFP remains resistive, allowing for effective electron conduction to an external load or power grid without excessive dissipative voltage loss. Another advantage of doped silicon FFPs is ease of mass-producibility.

As suggested above, aligned arrays of fullerenes can be adhered to the surfaces of the FFPs to form the GDL's of the fuel cells disclosed herein. U.S. Pat. Nos. 5,879,827; 4,328, 080; and 5,795,672 disclose vapor deposition processes which can be used in accord with the principles of the present invention to achieve this objective.

One above-discussed advantage of using fullerenes to deliver fuel and oxidizer to the catalytic electrodes of the novel fuel cells disclosed herein is that of greater structural rigidity. This rigidity is due to the presence of the nanoscale carbon structures, whether associated with an FFP or a conventional GDL material.

As just discussed, the fullerene gas distributors can be affixed to the FFPs of the fuel cell to form the requisite GDL.

Alternatively, the GDLs can be fabricated by affixing the nanotubes to a conventional, porous GDL material such as one fabricated from a conventional GDL material such as Teflon-impregnated carbon paper, an aerogel, or a carbon fibermat. In these GDLs, the nanotubes significantly increase resistance to crushing, a problem which conventional GDLs have.

Figure 6:
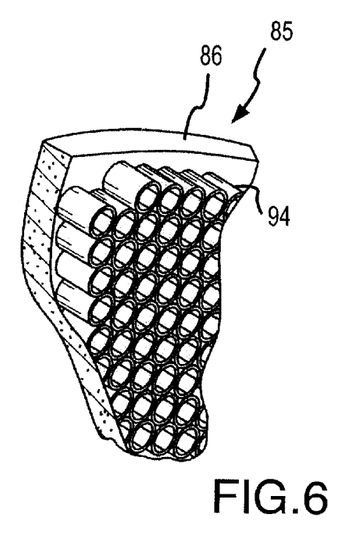
FIG. 6 is an enlarged partial view of a GDL illustrated in FIG. 4, illustrating an array of aligned nanotubes.

The nanotubes 94 (illustrated in FIGS. 6–8) in this subject embodiment of the invention provide a gas conduit from the flow field interfaces to catalyst sites located on the PEM 92. FIG. 6 is a partial, enlarged view of GDL 85 (see FIG. 4) illustrating a particular embodiment of this aspect of the present invention wherein the aligned nanotubes 94 are fixed to a layer of GDL material 86 and conduct gas from the interdigitalized FFP channels 82 (see FIG. 4) directly to the catalytic cathode on PEM 62. This not only enhances gas delivery, but also enhances current collection and facilitates the transmission of electrons from the reaction sites and conductive GDL to the FFP 74 (see FIG. 4) and an external load or grid. The aligned nanotubes 94 also act as conductors to transmit electrons from the fuel cell cathode to the FFP at that electrode.

Figure 7:
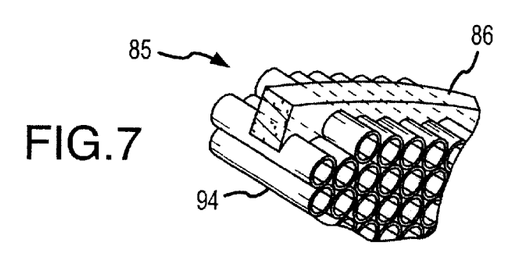
FIG. 7 is a view like FIG. 6 wherein the aligned nanotubes are embedded in and extend through the GDL.

The placement of the nanotubes 94 may be effected by various methods such as those described in the above-described patents. The nanotubes may also be impregnated within the FFP and/or extended through the GDL to most efficiently deliver the reactant gases to the catalyst sites on the PEM 92. FIG. 7 illustrates the nanotubes 94 passing directly through or embedded in the GDL.

Figure 5:
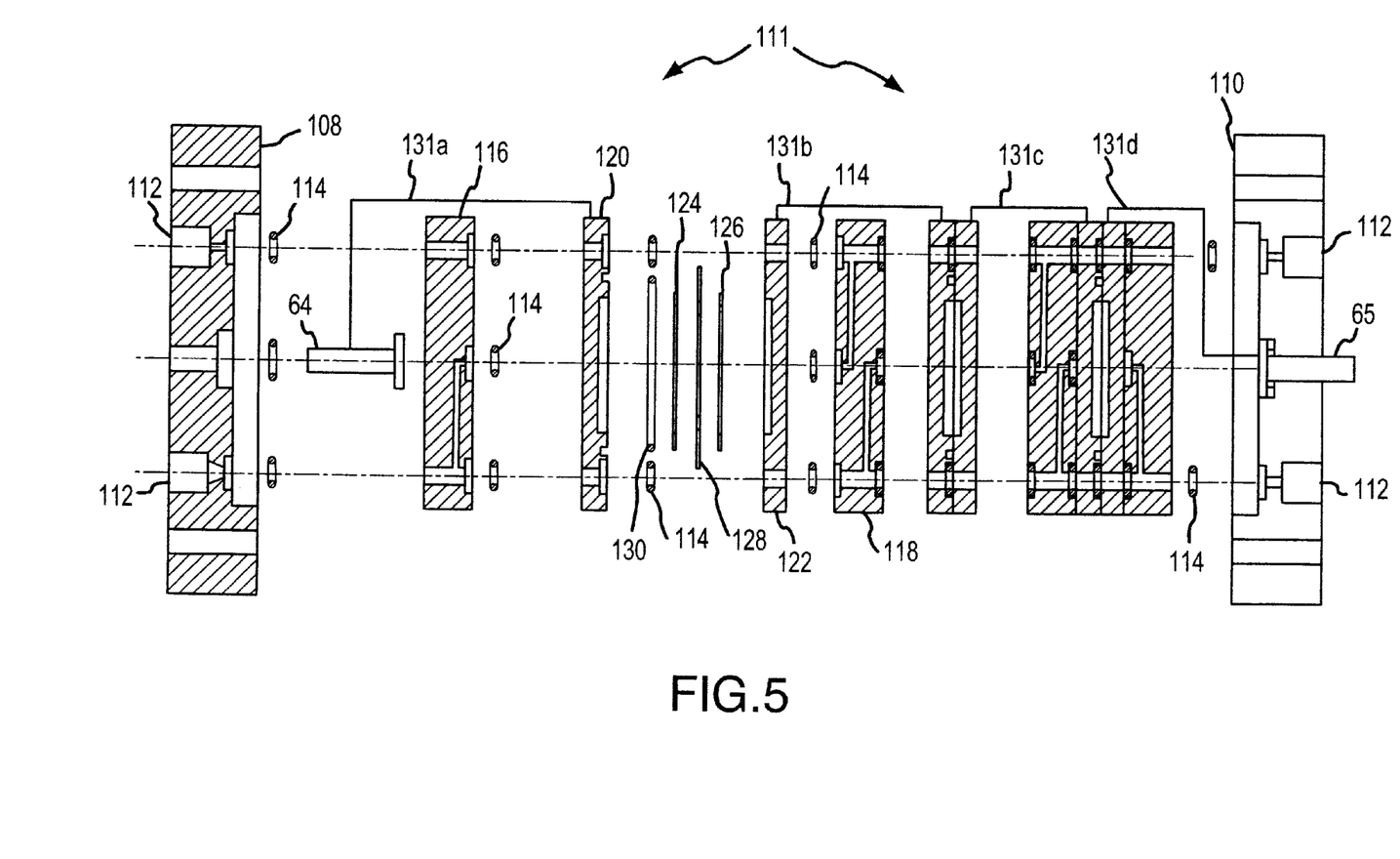
FIG. 5 is an exploded cross-sectional view of a multistage fuel cell stack embodying the principles of the present invention.
Figure 8:
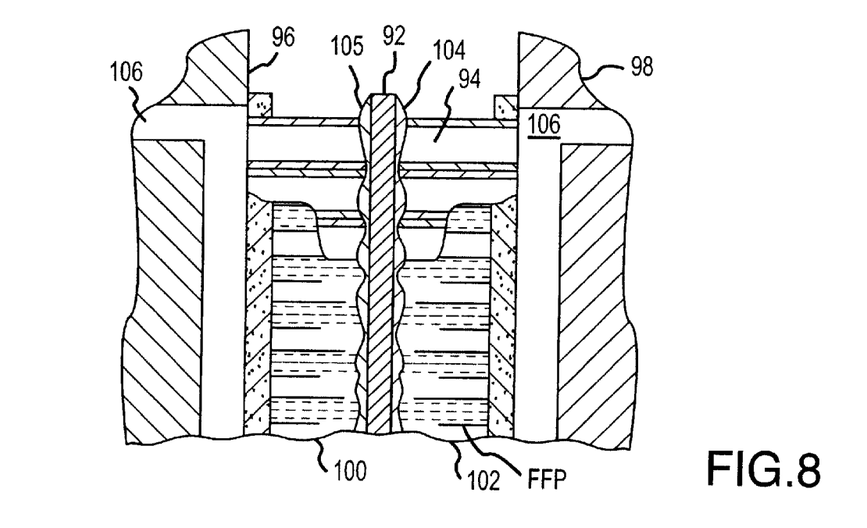
FIG. 8 is an enlarged, partial cross-sectional view of an assembled fuel cell as shown in FIG. 5, illustrating the relative position of the aligned nanotubes in conjunction with other elements of the fuel cell.

FIG. 8 is a cross-sectional view of an assembled fuel cell such as that in FIG. 5 where the nanotubes 94 have been impregnated into the FFPs 96, 98 and pass directly through GDL layers 100, 102 to catalytic electrodes 104 and 105 on opposite sites of PEM 92. The interdigitalized channels 106 of FFPs 96, 98 supply gas to the ends of the aligned nanotubes for distribution over the catalyst sites on PEM 92.

Referring now primarily to FIG. 5, we illustrate an exploded cross-sectional view of a stacking configuration for multistage (or stacked) fuel cells of the present invention. Non-conductive casing components 108, 110 enclose the assembled, functional components of the PEM fuel cell stack 111. Each casing component has gas flow passages (or channels) 112 to deliver gas to a fuel cell in the stack. Elastomeric face seals 114 seal the gas flow passages within the stack and between each successive layer or individual fuel cell unit or component.

A single sided manifold plate 116 is incorporated into the stack at each end of the stack to direct the flow of reactant gases into and out of the stacked fuel cells. Fuel and oxygen FFPs 120, 122 surround the other, casing-housed functional components of the individual fuel cell as described previously in relation to FIG. 4. Conductive, gas distributing GDLs 124, 126 are located between FFPs 120, 122 and the proton exchange membrane 128, which has a catalytic electrode layer (not shown) on each side thereof. Although FIG. 5 depicts a stack of only three individual fuel cells, the stacking configuration is suited for stacks incorporating a larger number of fuel cells shown in that figure.

A double sided, stackable manifold 118 separates each individual fuel cell in stack 111 from the adjacent fuel cell and provides a means of conducting the reactant gases from one fuel cell to the next. This double sided manifold plate provides gas flow passages for FFPs located on either side thereof, and incorporates all necessary gas seal grooves for seating the requisite static face seals in the gas flow passages. An elastomeric static face seal 130 seals the interior of each individual fuel cell unit.

Electrically, the fuel cells in stack 111 are connected in series by conductors 131*a–d*. Conductors 131*a* and 131*d* are in turn connected to collectors 64 and 65, the latter in turn being connected to external load or grid circuitry.

The electrodes (FFPs), GDLs, catalyst, and membrane electrolyte (PEM) together form the membrane electrode assembly ("MEA"), and constitute the functional components making up the individual fuel cell units.

A number of materials and fabrication techniques may be employed to produce a MEA. An improved method of manufacturing a high quality MEA capable of achieving high fuel cell power densities is set forth in Example I below:

EXAMPLE I

A commercially available Nafion® membrane is the preferred choice for the PEM fuel cell electrolyte. Nafion is a perfluorosulfonate ionomer; it is described at Internet web site http://www.psrc.usm.edu/mauritz/nafion.htm.

The general chemical structure of Nafion is:

where X is a sulfonic functional group and $M^+$ is: (a) a metal cation in the neutralized form of the isonomer and $H^+$ in the acid form of the ionomer.

Nano-scale platinum and platinum alloy powders embedded in active carbon particles may be used for the electrode material (Pt is known to catalyze the electro-chemical reaction at the normal operating temperatures of the PEM fuel cell).

The fabrication of the membrane/catalyst layers is as follows:

1. Cut Nafion® membrane into desired size;
2. Clean membrane by boiling in hydrogen peroxide for 1 hr.;
3. Boil membrane in a sodium hydroxide solution for 1 hr. to convert the Nafion from the acidic ($H^+$) to a neutral ($Na^+$) form. This increases the stability of the Nafion's sulfonic groups and water uptake and facilitates the steps which follow;
4. Rinse the membrane in deionized water;
6. Frame and dry membrane;
7. Prepare a Pt/C ink by mixing Pt, 20 wt % on VULCAN™ XC-72R carbon w/Nafion® solution, isopropyl alcohol, a glycerol spreading promoter, and t-butyl ammonium hydroxide (curing agent). The ratio of catalyst to Nafion® is preferably within the range of 5:2 to 3:1 based on the weight of the solids in the solution.
8. Apply Pt/C ink to each side of the membrane;
9. Dry the ink (120 min. @ 135° C. in a vacuum oven);
10. Hot-press the MEA @150°–180° C. for 60–100 sec. @77 atm;
11. Rinse MEA in deionized water;
12. Boil the MEA in 0.5M $H_2SO_4$ solution for 1 hr. to convert the Nafion back to its acidic form. This is done so that the electrolyte will be capable of conducting protons ($H^+$ ions) from the anode to the catnode of the fuel cell;

13. Rinse and store MEA in deionized water to prevent dehydration

Application of the Pt/C ink solution to the membrane may be accomplished by air brushing, spin coating, dip coating, screen printing, sputtering, physical vapor deposition, precipitation reaction, or by implementation of a sol-gel process. Application of the catalyst material by air brushing is a common technique, but other techniques may produce more uniform distribution of catalyst and greater control over the thickness of the catalyst layer. The thickness may range from 1 to 2,000 angstroms.

The catalyst layer is preferably prepared from the Pt/C ink described above, but the catalyst component of the ink in general be a mixture of: platinum and: (a) ruthenicum., or (b) one or more transition metal elements or a metal selected from Groups IIIA or IVA of the periodic table of elements. Suitable Pt alloys are:

3 to 17 wt. percent Pt, balance Ru 3 to 17 wt percent Pt, balance M, where M is an element as just described.

The heat treatment or hot press of the MEA set forth in Example I above may be accomplished by any combination of pressure, temperature, and time sufficient to partially embed the electrolyte materials in the membrane. The precise conditions used depend in part on the nature of the alloy or metal employed as the catalyst. Typical temperatures range between 80° and 300° C., most preferably between 100° and 150° C. Typical ranges for pressure are between 90 and 900 MPa, most preferably between 180 and 270 MPa.

Hydration of the MEA (required for it to operate effectively) may be achieved with an acid boil, a water boil, a cold-water soak, or any combination thereof.

The application of nanotubes or other fullerenes to the FFPs or to a conventional GDL material support may be accomplished by a variety of methods including the vapor deposition techniques described in those patents cited above. There are several routes to synthesize "single-walled" carbon nanotubes in situ, one preferred technique for providing aligned nanotube arrays in accord with the principles of the present invention. One in situ technique which can advantageously be used is chemical vapor deposition ("CVD") of various hydrocarbon compounds such as methane at controlled locations on a substrate using patterned catalytic islands. This combined synthesis and microfabrication technique allows a large number of ohmically contacted nanotube devices of controllable length to be placed on a single substrate.

The synthesis of bulk amounts of high quality single-walled carbon nanotubes ("SWNTS") can be accomplished by optimizing the chemical compositions and textural properties of the catalyst material used in the CVD of methane. A series of catalysts have been derived by systematically varying the catalytic metal compounds and support materials. The optimized catalysts are Fe/Mo bimetallic species supported on a multicompound silica-alumina multicomponent material. The high SWNT yielding catalyst exhibits high surface area and large mesopore volume at elevated temperatures. The nanotube material consists of individual and bundled SWNTs that are free of defects and amorphous carbon coating.

Another method for fabricating large arrays of parallel carbon nanotubes is by pyrolysis of acetylene on cobalt within a hexagonal, close-packed, nano-channel alumina template. This method, which is based on template growth, has an advantage over other methods in that it is nonlithographic and does not require a clean room. The arrays of carbon nanotubes produced by this method have an unprecedented level of periodicity and uniformity.

The preparation of the FFPs, aside from the incorporation of aligned nanotubes, may be accomplished using standard silicon wafer doping and etching techniques such as those identified above wherein a layer of the silicon is doped with a semi-conducting element, and then etched into a desired pattern. This is followed by application of ohmic contacts to serve as interfaces for external electrical connections. The FFPs are also designed to accommodate a novel integrated silicon nozzle for hydrating the fuel cell membrane. The nozzle (shown at 200 in FIG. 2A) produces a fine colloidal mist of water vapor which is entrained in the reactant gas. The gas is delivered to the reaction sites on the surface of the membrane.

The FFPs of the present invention are further constructed to accommodate an electrical connection for receipt and transmission of communications and monitoring information regarding several aspects of the fuel cell.

Figure 9:
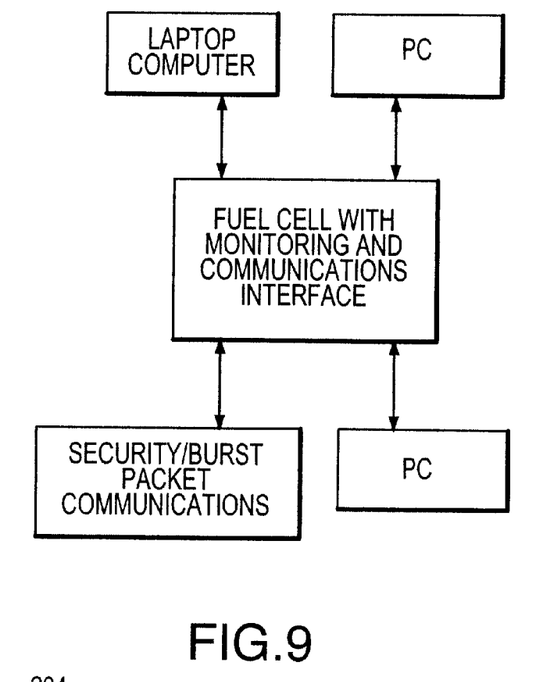
FIG. 9 is a block diagram illustrating the communication and control interfaces with which a fuel cell of the present invention is designed to function.
Figure 10:
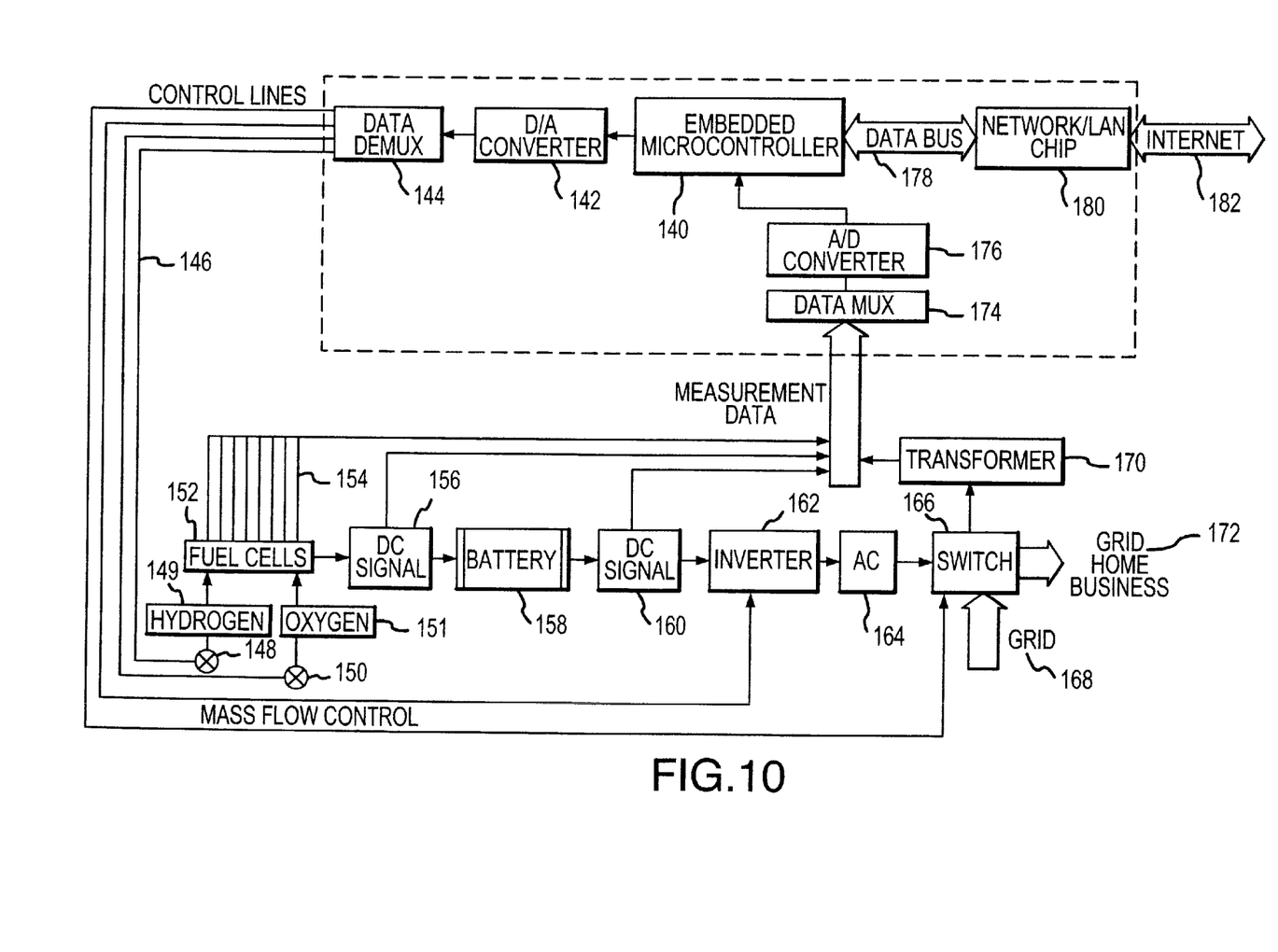
FIG. 10 is a flow diagram illustrating the fuel cell monitoring and communication features of the present invention, and interactions between the controller and the fuel cell system.
Figure 11:
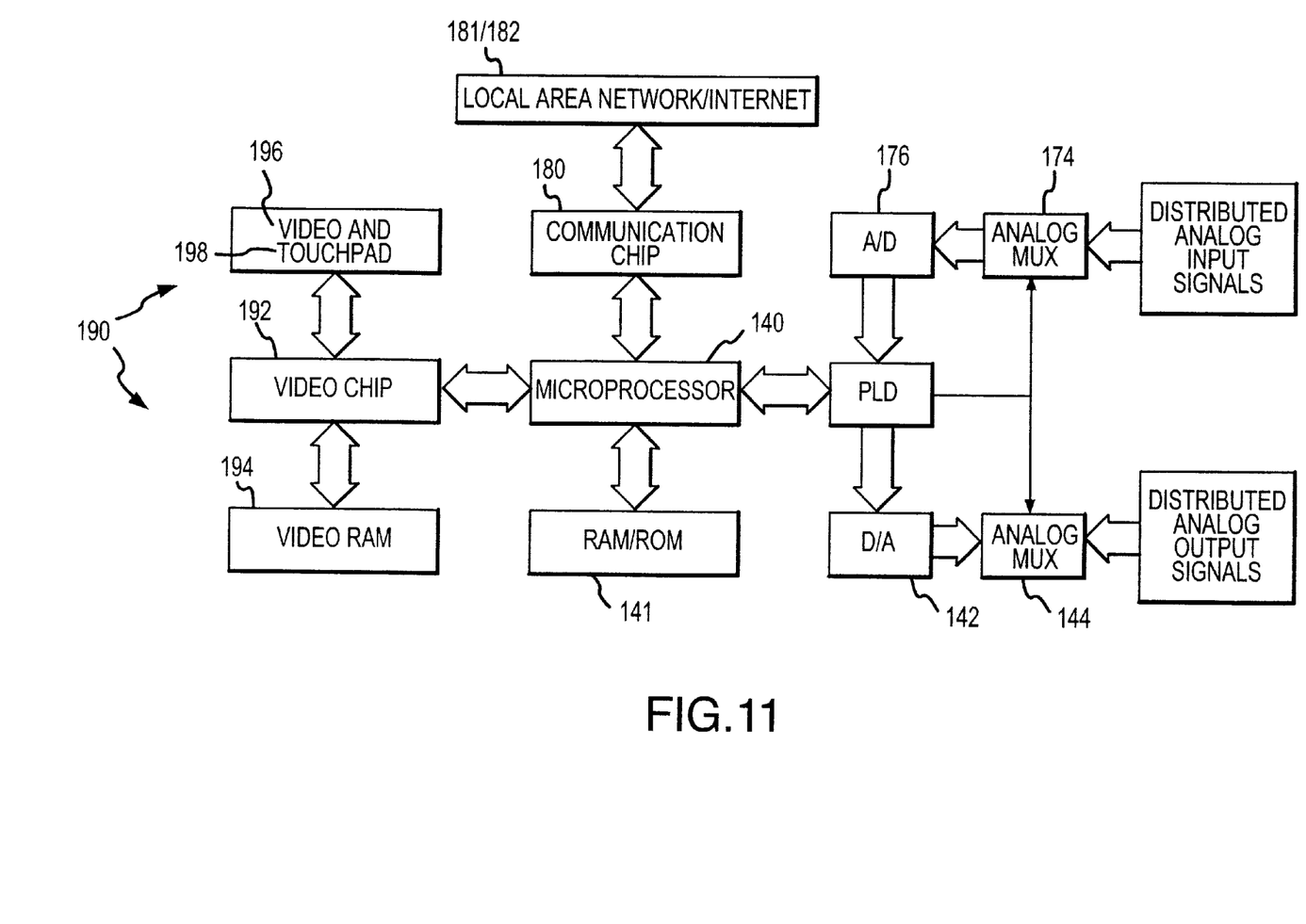
FIG. 11 illustrates the relationship of the hardware components of a system for controlling the fuel cell system of the present invention.

Referring now to FIGS. 9–11, FIG. 9 illustrates the interrelationship of a fuel cell monitoring and communication system with various electronic devices ("monitoring" will also typically include "control" capabilities and functions). This novel communication and interface system can be employed in fuel cells designed to be incorporated into homes (smart homes), offices, and elsewhere. The fuel cell monitoring/communication system is connected to the fuel cell at the FFP and can have Ethernet, Internet, and burst packet communications capabilities as well as other analog and digital communications capabilities.

The electronic circuitry which provides the communication and monitoring capabilities of the fuel cells, including microprocessor 140, can be embedded in the FFP with the circuitry being isolated by undoped silicon. The communication and monitoring electronics are thereby insulated from the power generation component of the FFP. Alternatively, the circuitry and FFP can be fabricated separately and connected to the FFP by various methods such as welding, fusing, and gluing; or the circuit components may be mechanically attached using a holder, horseshoe clip, tongue and groove system, or any other means of attachment. This integrated monitoring system allows for direct monitoring of single and aggregate fuel cell stacks. The fuel cell itself can be the power source for the monitoring/communication system, which may include a wireless LAN acting as a relay station for wireless (digital) devices, i.e., computers, laptops, personal communication systems, retinal eye scanning devices, etc.

Currently, no developed systems exist which implement a remote monitoring application for fuel cells. By creating such a system which permits remote power application of fuel cells to residential and commercial sites, an individual user can be freed from an expensive utility grid, or have an alternative source of electricity during peak hours or in the event of some disruption in service from the utility provider.

In order to ensure that the fuel cell system is functioning correctly, it must be under constant monitoring and control and, as such, an embedded control system that can perform such a task without constant human intervention and supervision is required.

Referring now primarily to FIGS. 10 and 11, an embedded microcontroller/microprocessor 140 controls the flow of information between the fuel cell(s) and a remote site from which one may execute a variety of commands to control or monitor the status of the fuel cell's operation or fuel levels, etc. Parameters which may be monitored and/or controlled include, but are not limited to:

fuel pressure fuel flow rate oxidizer pressure oxidizer flow rate fuel cell temperature fuel cell internal resistance fuel cell output voltage fuel cell external current level One or more sensors typically but not necessarily associated with a fuel cell FFP are provided to measure the parameter. The sensor may be incorporated in the FFP as shown at 120 in FIG. 4 or may be fabricated separately and attached to the FFP by any appropriate technique (not part of the present invention).

A microprocessor 140 with RAM/ROM 141 executes the commands received by the system to direct the fuel cell's function and the switching of the electrical supply from a power grid to the fuel cell, or to another power grid, home, or business, etc.

A digital-to-analog converter 142 converts the signals from the microprocessor to analog form and conveys the signals to a data demultiplexer 144 provided so that the respective signals can then be directed over control lines 146 to specific elements of the fuel cell or power management system.

Hydrogen and oxygen mass flow controls 148, 150 control the flow of reactant gases from hydrogen and oxygen storage tanks 149, 151 into the fuel cell stack 152 based on the user's electrical output requirements. Monitoring lines 154 ultimately enable the user to view the status of the individual fuel cell units in the stack in terms of voltage and/or current production, as well as internal resistance and membrane status for evaluating water management issues.

A direct current ("DC") output signal 156 output from the fuel cell stack may also be communicated to the user for evaluating whether changes need to be implemented in the operation of the fuel cell aggregate.

The fuel cell electrical output is stored in a battery 158 which will provide power when called upon to do so. The DC current 160 coming from the battery is measured to provide user feedback, and is transmitted to an inverter 162 for conversion to alternating current ("AC") 164 capable of being used in a typical home or office or elsewhere in the same way that electrical power from a utility provider is used.

The ultimate arbiter directing the flow of electrical energy is a switch 166, controlled by the user, system operator, etc. which allows electrical energy to be sent to, or received from, a variety of sources such as a power grid 168; a transformer 170; a home or business 172, etc.

Measurement information from the power generation and management system is received by a data multiplexer 174. The multiplexer brings about the serial transmission of the several input signals to analog-to-digital converter 176. The digital signal is then transmitted to the embedded microcontroller/microprocessor 140 from which it may be directed over a data bus 178 to a network or local area network chip 180 where the status and control information can ultimately be communicated over LAN 181 and/or the Internet 182 to the user/controller.

As a further example, and as is shown in FIG. 11, data can be transmitted to, and control signals received from, a PDA or other modem-connected or wireless device. The typical device 190 shown in FIG. 11 includes a video chip 192, video RAM 194, a video display 196, and a touchpad 198 by which commands can be input to microprocessor 140.

Having the ability to interact with the power generation and management system of the present invention provides the user or power system controller with the ability to remotely activate the power generating system in the event of a brownout, or during peak electrical demands when the cost of electrical power may be excessive. Such access also provides an emergency source of electrical power in the event of a blackout or other disruption in the supply of power from the local utility company.

Data may be acquired so that the user can evaluate the pressure and flow rates of the reactant gases, the temperature of the heating and/or cooling features of the cells, the voltage and current for each individual fuel cell, fuel cell stack, or aggregate of fuel cell stacks, as well as internal resistance and membrane status for water management as discussed above. This information allows one to monitor the fuel cell's status, and to change system parameters from a remote location to meet the user's present demands. The interface also permits one to switch connections to and from different utilities or locations depending on users' needs and the availability and costs associated with electrical power from other sources.

A preferred implementation of this subject monitoring/control uses a PSC1000 microprocessor, available from Patriot Scientific Corp., a TCP/UDP/IP through Java communications protocol, and an Ethernet chip for the hardware communication. The PSC1000's native Java performance will enable any device to easily connect to the Internet for communication of information and data to and from the user.

Figure 12:
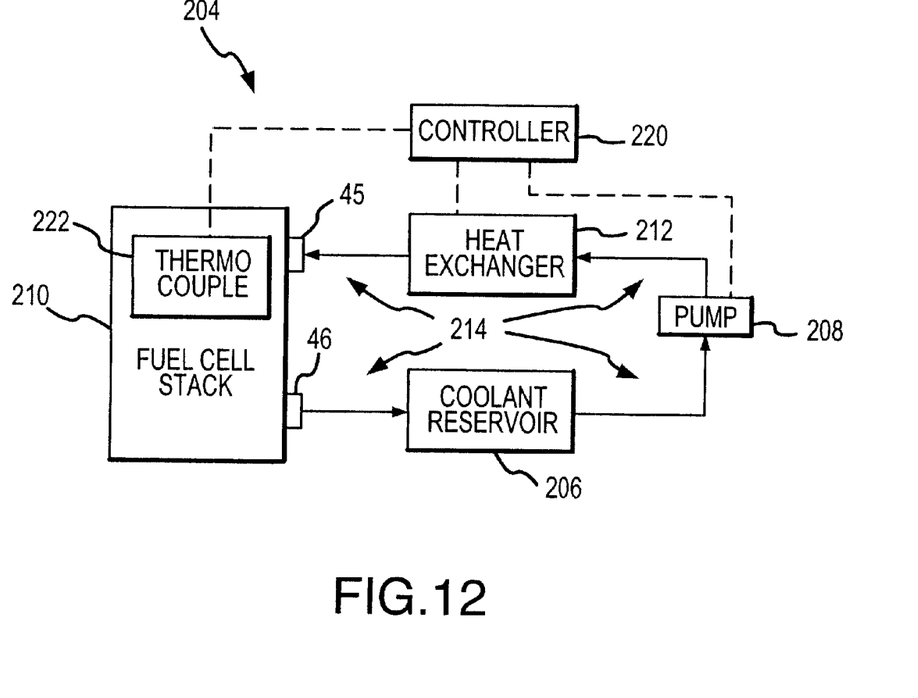
FIG. 12 is a schematic diagram of a heating/cooling system employed in accordance with the principles of the present invention to promote efficient operation by keeping constant the operating temperature of an associated fuel cell or fuel stack also embodying the principles of the invention.

It was pointed out above that installations embodying the principles of the present invention preferably have a heating/cooling system for promoting efficient fuel cell operation by keeping the operating temperature of the fuel cell or fuel cell stack constant (typically at a temperature in the range of 6°–90° C.) A representative system 2_s shown in FIG. 12. That system includeds a reservoir 206 for the coolant (typically water), a pump 208 for effecting the flow of the coolant from reservoir 206 to fuel cell or fuel cell stack 210, a heater or charger 212 for adjusting the temperature of the coolant, and plumbing identified collectively by reference character 214 for connecting the foregoing components in series with each other and fuel cell unit inlet and outlet ports 45 and 46. A controller 220 with feedback from fuel cell unit thermocouple 222 controls the operation of heat exchanger 212 and pump 214, adjusting the termperature and/or flow rate of the coolant as needed to keep the fuel cell component operating temperature constant. Typically, this will involve the cooling of the coolant. However, ther eare circumstances—such as start-up—when heating the coolant may be advantageous.

As will be apparent to the reader, the present invention may be embodied in many forms without departing from the spirit or essential characteristics of the invention. The present embodiments are therefore to be considered in all respects as illustrative and not restrictive. The scope of the invention is indicated by the appended claims rather than by the foregoing description and the drawings; and all changes which come within the meaning and range of equivalency of the claims are intended to be embraced therein.

What is claimed is:

1. A fuel cell which comprises:

first and second flow field plates;

an electrolyte between the flow field plates;

catalytic electrodes on first and second, opposite faces of the electrolyte for promoting the dissociation of a fuel at the first face of said electrolyte and the formation of water at the second face of the electrolyte, and a system for delivering a gaseous fuel through the first flow field plate to the first face of the electrolyte, said system comprising an array of nanotubes oriented to discharge said fuel into contact with the catalyst on the first face of the electrolyte.

2. A fuel cell as defined in claim 1 in which the nanotubes are carbon fullerenes.

3. A fuel cell as defined in claim 1 in which the nanotubes are impregnated in said first flow field plate.

4. A fuel cell as defined in claim 1 in which said nanotubes are attached to a surface of said first flow field plate.

5. A fuel cell as defined in claim 4 in which said nanotubes are attached to the flow field plate by sputtering.

6. A fuel cell as defined in claim 4 in which the nanotubes are attached to the flow field plate by chemical vapor deposition.

7. A fuel cell as defined in claim 4 in which the flow field plates are attached to the flow field plate by physical vapor deposition.

8. A fuel cell as defined in claim 1 in which the nanotubes are placed only on selected areas of the FFP.

9. A fuel cell as defined in claim 1 in which the gaseous fuel delivery system:
   comprises gas inlet channels in the flow field plate to which the fuel can be transferred from an external source;
   said nanotubes being in fluid communication with said gas inlet channels.

10. A fuel cell as defined in claim 1 which has a system comprising an array of aligned nanotubes for delivering a gaseous oxidizer into contact with the catalyst on the second face of the electrolyte.

11. A fuel cell as defined in claim 1 in which the electrolyte is a proton exchange membrane.

12. A fuel cell as defined in claim 1 which includes circuitry comprising said nanotubes for conducting electrons liberated at the first face of the electrolyte to an external load.

13. A fuel cell as defined in claim 1 in which said nanotubes are impregnated in a carrier and said carrier is placed on said the face of the electrolyte.

14. An electrical power generation device comprises a stacked array of fuel cells as defined in claim 1.

15. An assembly for a fuel cell comprising:
   an electrolyte membrane;
   a plurality of catalyst sites on first and second, opposite faces of the electrolyte for promoting the disassociation of a gaseous fuel at the first face and the formation of a byproduct at the second face;
   a plurality of electrically-conductive nanotubes oriented to conduct a gaseous fuel to the plurality of catalyst sites on the first face of the electrolyte, the nanotubes being electrically connected to the catalyst sites to receive an electrical current therefrom.

16. The assembly of claim 15 wherein the nanotubes have a first aperture proximate to catalyst on the first surface of the electrolyte and a second aperture remote therefrom, the apertures being of sufficient size that fuel can enter the nanotubes through the remote aperture assembly further comprising a first flow field plate for conducting a gaseous fuel to the second apertures of the nanotubes.

17. The assembly of claim 15 wherein the nanotubes are embedded in a layer of gas diffusion layer material.

18. The assembly of claim 16 wherein the nanotubes are embedded in an electrically-conductive layer of a gas diffusion layer material.

19. The assembly of claim 16 wherein the nanotubes extend through a conductive layer such that the first apertures of the nanotubes are on one side of the layer and the second apertures of the nanotubes are on the other, and wherein the nanotubes are electrically connected to the conductive layer.

20. The assembly of claim 15 wherein the electrolyte membrane comprises a proton exchange membrane.

21. The assembly of claim 15 wherein the electrolyte membrane blocks the flow of the gaseous fuel from the first side of the membrane to the second side of the membrane.

22. The assembly of claim 21 wherein the nanotubes have a first aperture proximate to catalyst on the first surface of the electrolyte and a second aperture remote therefrom, the apertures being of sufficient size that fuel can enter the nanotubes through the remote aperture assembly further comprising a first flow field plate for conducting a gaseous fuel to the second apertures of the nanotubes.

23. The assembly of claim 22 wherein the nanotubes are embedded in an electrically-conductive layer of a gas diffusion layer material.

24. The assembly of claim 22 wherein the nanotubes extend through a conductive layer such that the first apertures of the nanotubes are on one side of the layer and the second apertures of the nanotubes are on the other, and wherein the nanotubes are electrically connected to the conductive layer.

25. The assembly of claim 24 wherein the nanotubes are fullerenes.

* * * * *